United States Patent Office 3,505,397
Patented Apr. 7, 1970

3,505,397
PROCESSES FOR THE AUTOXIDATION OF
SUBSTITUTED BENZENES
James W. Patton, Littleton, and Ned F. Seppi, Denver,
Colo., assignors to Marathon Oil Company, Findlay,
Ohio, a corporation of Ohio
No Drawing. Filed May 1, 1967, Ser. No. 634,910
Int. Cl. C07c 63/02, 63/04, 63/14
U.S. Cl. 260—524                                    8 Claims

ABSTRACT OF THE DISCLOSURE

The present invention comprises a process for the autoxidation of substituted benzenes substituted with from 1 to 3 substituent groups selected from the class consisting of alkyl groups, aldehydo groups, carbinol groups, and combinations thereof in which substituent groups the carbon atom alpha to the ring is connected from 0 to 2 other carbon atoms, said process comprising in combination the steps of reacting said substituted benzenes with oxygen in the conjoint presence of a catalytic amount of a transition metal or salt thereof and an effective amount of 2-methyl-butanoic acid at a temperature of from about 50 to about 250° C. The products of the invention comprise acids, e.g. terephthalic acid, isophthalic acid, trimesic acid, and benzoic acid. The polycarboxylic acids of the present invention are useful for the production of a wide variety of polymers, e.g. polyesters, polyamides, etc. Benzoic acid is a widely used starting material for the production of other organic compounds, as a mordant in dye printing processes, in the seasoning of tobacco, in flavors and perfumes.

BACKGROUND OF THE INVENTION

Field of the invention

The present invention relates to the field of autoxidation (that is, oxidation with oxygen under conditions which do not produce free flames) of substituted benzenes which are substituted with hydrocarbon groups (or partially oxidized hydrocarbon groups) in the presence of transition metal catalysts wherein such autoxidation reactions are enhanced by the additional presence of an activator which is co-oxidized simultaneously with the substituted benzenes.

Description of the prior art

A variety of processes have been previously taught involving the autoxidation of hydrocarbon substituted benzenes in the present of transition metal catalysts. Certain of these have also involved the presence of activators which are co-oxidized simultaneously with the oxidation of the alkyl benzenes. However, to the best of our knowledge, no previous process has taught the co-oxidation of such substituted benzenes in the presence of the activator which has been discovered by the present invention.

SUMMARY

The present invention embodies the discovery that 2-methylbutanoic acid (alpha-methylbutyric acid) is a highly effective activator for autoxidation processes involving the oxidation of substituted benzenes which are substituted with from 1 to 3 hydrocarbon groups which can be alkyl, aldehydo, or carbinol groups. Preferably the substituting hydrocarbon groups will not be adjacent on the ring and will contain from about 1 to 10, more preferably from 1 to about 6, and most preferably from 1 to about 3 carbon atoms per group. In such groups the alpha carbon atoms should be connected from 0 to 2 other carbon atoms, and the groups can contain double or triple bonds. The groups in a single nucleus can be the same or different, the nucleus may also contain other non-hydrocarbon, non-interfering groups which are not affected by the conditions of the present reaction, e.g. halides.

The efficacy of 2-methylbutanoic acid for the purposes of the present invention is especially unexpected and surprising in view of the much lower enhancement provided by isomers of this acid, e.g. 3-methylbutanoic acid (isovaleric acid), 2,2-dimethylpropanoic acid (pivalic acid), and pentanoic acid (valeric acid) as shown in Examples IV–XIII hereof.

As used herein the term "transition metal catalyst" means the metals having atomic numbers of 21–28, 39–46, 57–78 inclusive, and the soluble (in the reaction mixtures of the present invention) salts thereof. A transition metal catalyst of the present invention will be present in catalytic amounts, preferably in amounts sufficient to render the reaction mixture from 0.001 to 1.0 molar in the metal ions, more preferably from 0.05 to 0.5 molar, and most preferably from 0.2 to 0.3 molar. Manganese, and particularly, cobalt and their salts are preferred for the present invention.

While not absolutely necessary to the practice of the present invention, solvents may be added to the reaction mixture. Such solvents should be oxygen-containing hydrocarbons which are both liquid and not subject to further oxidation under the conditions of the reaction. Because of its stability, low cost, and wide availability, acetic acid is the most preferred solvent for the purposes of the present invention. The solvent may be used in varying amounts of from about 0.02:1 to about 50:1 based on the volume of substituted benzenes present in the reaction mixture being preferred.

While not narrowly critical, temperatures in the practice of the present invention will preferably be from 50 to about 250° C., with temperatures of 75 to 175° C. being more preferred, and temperatures of 100 to about 135° C. being most preferred. Similarly, while not narrowly critical, pressures of from 0 to about 2,000 p.s.i.g., more preferably from 50 to about 1,000 p.s.i.g., and most preferably from 75 to about 250 p.s.i.g., will be preferred for the present invention. All of the pressures given above are the partial pressures of oxygen, and the total pressure may be increased above such values by dilution with nitrogen or other gases. Air may be used in the practice of the present invention. In all cases, the partial pressure of oxygen should be carefully controlled in order to regulate the considerable exotherm of the reaction and prevent explosions or combustion.

In most cases, it will be convenient to control the progress of the reaction and to determine when to discontinue the reaction by watching the oxygen absorption rate. Oxygen flow is not especially critical, but will generally be regulated so as to accomplish the oxidation of the reaction mixture to the desired degree within a time interval of about 0.1 to about 10.0 hours, more preferably from 0.3 to about 5 hours, and most preferably from about 0.5 to about 3 hours.

While the present invention will normally be conducted on a batch basis, it may readily be adapted to a continuous basis with the substituted benzenes, oxygen, catalysts, and activator being continuously added to a reaction zone, and the products continuously removed from the reaction zone.

EXAMPLE I

A Fischer-Porter glass aerosol compatibility tube is charged with 3.00 ml. of p-xylene, 1.00 ml. of alpha-methylbutyric acid, and 25 ml. of a 0.20 M solution of cobaltous acetate tetrahydrate in acetic acid. The solution is stirred magnetically in an oil bath at 125° C. The vessel is maintained under a constant pressure of 100 p.s.i.g. with oxygen fed from a pressure reservoir. The gases above the reactor are circulated through Mallcosorb to remove carbon dioxide formed during the autoxidation. After 2.5 hours, the reaction is stopped, the reactor is cooled and the terephthalic acid filtered off and dried. A yield of approximately 74.9% terephthalic acid is obtained. (All yields herein are based on para-xylene charged and on product obtained on a 100% purity of desired product bases.) Most runs herein yielded about 10% of partially oxidized precursors to the desired product, e.g. in this Example I about 10 percent of the acids produced were partially oxidized precursors primarily paratolouic acid which may be recycled and eventually recovered.

EXAMPLES II AND III

According to the procedure of Example I the reactions of the present invention are conducted utilizing twice and five times the amount of alpha-methylbutyric acid activator utilized in Example I with further enhancements of yield as shown in Table I below.

EXAMPLES IV THROUGH XIII

In contrast to the present invention, when compounds isomeric to, or of very close structural similarity to the alpha-methylbutyric acid (2-methylbutanoic acid) of the present invention are utilized in its place, considerably reduced yields of the desired products are obtained as shown in Table I below.

TABLE I.—AUTOXIDATION OF p-XYLENE
[At 125° C. and 100 p.s.i.g.]

3 ml. p-xylene, 25 ml. 0.20 M $Co(OAc)_2 \cdot 4H_2O$ in acetic acid, plus carboxylic acid activator

| Example No. | Activator [1] | Reaction Time (hrs.) | Max. Temp. (° C.) | Mmoles $O_2$ Absorbed | Mole percent Yield Terephthalic Acid |
|---|---|---|---|---|---|
| I | 1 ml. α-methylbutyric acid. | 2.5 | 151 | 96 | 74.9 |
| II | 2 ml. α-methylbutyric acid. | 2.5 | 140 | 122 | 82.3 |
| III | 5 ml. α-methylbutyric acid. | 2.5 | 140 | 188 | 84.5 |
| IV | None | 2.5 | 163 | 70 | 50.8 |
| V | 1 ml. propionic acid | 2.5 | 142 | 68 | 61.2 |
| VI | 2 ml. propionic acid | 2.5 | 150 | 80 | 59.3 |
| VII | 5 ml. propionic acid | 2.5 | | 91 | 64.2 |
| VIII | 1 ml. β-methylbutyric acid. | 2.5 | 143 | 80 | 56.7 |
| IX | 2 ml. β-methylbutyric acid. | 2.5 | 135 | 88 | 55.7 |
| X | 5 ml. β-methylbutyric acid | 2.5 | 150 | 108 | 56.7 |
| XI | 1 ml. pivalic acid | 2.5 | 137 | 74 | 51.5 |
| XII | 2 ml. pivalic acid | 2.5 | 135 | 76 | 42.0 |
| XIII | 5 ml. pivalic acid | 2.5 | 135 | 90 | 26.2 |

[1] Gas circulation pump started at oxygen absorption plateau. Circulated through Mallcosorb to remove $CO_2$.

EXAMPLE XIV

When one ml. of valeric (pentanoic acid) is substituted for the propionic acid of Example V similar results are obtained.

EXAMPLE XV

When two ml. of valeric acid are substituted for the propionic acid of Example VI similar results are obtained.

EXAMPLE XVI

When five ml. of valeric acid are substituted for the propionic acid of Example VII similar results are obtained.

EXAMPLE XVII

When equal amounts of meta-xylene are substituted for the para-xylene of the preceding Example, where alpha-methylbutyric acid is used as the activator according to the present invention, substantially higher yields are obtained as compared to those obtained when the other closely structurally similar carboxylic acids are utilized.

EXAMPLE XVIII

When equal amounts of toluene are substituted for the para-xylene of Example XVI, where alpha-methylbutyric acid is used as the activator according to the present invention, substantially higher yields are obtained as compared to those obtained when the other closely structurally similar carboxylic acids are utilized.

EXAMPLE XIX

When equal amounts of dihexylbenzene are substituted for the para-xylene of Example XVI, where alpha-methylbutyric acid is used as the activator according to the present invention, substantially higher yields are obtained as compared to those obtained when the other closely structurally similar carboxylic acids are utilized.

EXAMPLE XX

When equal amounts of dibenzyl alcohol are substituted for the para-xylene of Example XVI, where alpha-methylbutyric acid is used as the activator according to the present invention, substantially higher yields are obtained as compared to those obtained when the other closely structurally similar carboxylic acids are utilized.

EXAMPLE XXI

When equal amounts of terephthaldehyde are substituted for the para-xylene of Example XVI, where alpha-methylbutyric acid is used as the activator according to the present invention, substantially higher yields are obtained as compared to those obtained when the other closely structurally similar carboxylic acids are utilized.

It should be understood that the present invention is susceptible to a wide variety of modifications and variations which will be obvious to those skilled in the art, and which are to be taken as being within the spirit of the claims appended hereto.

What is claimed is:
1. A process for the autoxidation of substituted benzenes substituted with from 1 to 3 substituent groups selected from the class consisting of alkyl groups, aldehydo groups, carbinol groups, and combinations thereof in which substituent groups the carbon atom alpha to the ring is connected from 0 to 2 other carbon atoms, said process comprising in combination the steps of reacting said substituted benzenes with oxygen in the conjoint presence of a catalytic amount of a transition metal or salt thereof and an effective amount of 2-methylbutanoic acid at a temperature of from about 50 to about 250° C.

2. The process of claim 1 in which the compounds are reacted in a reaction mixture which is from about 0.01 to about 2.0 molar in cobalt ions based on the total reaction mixture and wherein there are present from 0.5 to about 50% by volume of 2-methylbutanoic acid.

3. The process of claim 2 in which there is additionally present an oxygen containing solvent resistant to further oxidation under the conditions of the reaction and capable of maintaining a single phase reaction mixture.

4. The process of claim 1 in which the substituted benzenes comprise a major portion of meta-xylene.

5. The process of claim 1 in which the substituted benzenes comprise a major portion of para-xylene.

6. The process of claim 1 wherein the substituted benzenes comprise a major portion of toluene.

7. The process of claim 1 wherein the substituted benzenes comprise a major portion of mesitylene.

8. The process of claim 1 wherein the transition metal catalyst is selected from the group consisting of cobalt, manganese, salts thereof, and mixtures of the aforenamed metals and salts.

References Cited

UNITED STATES PATENTS 2,245,528   6/1941   Loder _____ 260—524
3,261,846   7/1966   Meyer _____ 260—524

LORRAINE R. WEINBERGER, Primary Examiner

R. S. WEISSBERG, Assistant Examiner

U.S. Cl. X.R.

260—523